(12) United States Patent
Hsu

(10) Patent No.: US 6,257,439 B1
(45) Date of Patent: Jul. 10, 2001

(54) HANDLE FOR A FOOD CONTAINER

(76) Inventor: Te Hui Hsu, No. 39, Kaian 3rd Street, Annan District, Tainan (TW)

(*) Notice: Subject to any disclaimer, the term of this patent is extended or adjusted under 35 U.S.C. 154(b) by 0 days.

(21) Appl. No.: 09/452,394

(22) Filed: Dec. 1, 1999

(51) Int. Cl.[7] .................................................. A47B 95/02

(52) U.S. Cl. .......................... 220/759; 220/769; 16/425

(58) Field of Search ................................... 220/759, 767, 220/768, 769; 16/425, 422, DIG. 440, DIG. 441

(56) References Cited

U.S. PATENT DOCUMENTS

| | | | |
|---|---|---|---|
| 2,362,720 | * 11/1944 | Reichart | 220/769 |
| 3,059,809 | * 10/1962 | Thompson, III | 220/769 |
| 4,206,853 | * 6/1980 | Iten et al. | 220/769 |
| 4,577,367 | * 3/1986 | Durand | 220/759 |
| 5,887,751 | * 3/1999 | Kroscher | 220/759 |
| 6,000,100 | * 12/1999 | Montgelard | 220/769 |
| 6,079,590 | * 6/2000 | Munari | 220/759 |
| 6,173,860 | * 1/2001 | Lamers | 220/759 |

* cited by examiner

*Primary Examiner*—Joseph M. Moy
(74) *Attorney, Agent, or Firm*—Rosenberg, Klein & Lee

(57) ABSTRACT

A handle is provided for a food container with a lip and includes a handle main body, a handle cover, an actuator, and a clamping member. The handle main body including a recess defined in a side thereof. The handle main body further includes a first clamping portion formed on a first end thereof and a second end for grasp. The handle cover is mounted to the handle main body for covering the side having the recess. The handle cover includes an opening. Then actuator is mounted in the recess of the handle main body and slidable along a longitudinal direction of the handle main body. The actuator includes a first end and a second end with an extension extended beyond the opening of the handle cover for manual operation. The actuator further includes a hole in a mediate portion thereof. A button includes an enlarged head and is mounted in the hole of the actuator and biased toward the handle cover by a first elastic member. A second elastic member is provided for biasing the actuator toward the first clamping portion. The clamping member includes a second clamping portion formed on a first end thereof and located outside the handle main body and a second end securely engaged with the actuator to move therewith. When the actuator is moved away from the first clamping portion and the button is thus moved to a position below the opening of the handle cover, the button is biased outward beyond the opening of the handle cover under the action of the first elastic member. The enlarged head of the button is retained between the extension of the actuator and an edge defining the opening of the handle cover under action of the second elastic element, thereby securely clamping the lip of the food container between the first clamping portion and the second clamping portion.

4 Claims, 4 Drawing Sheets

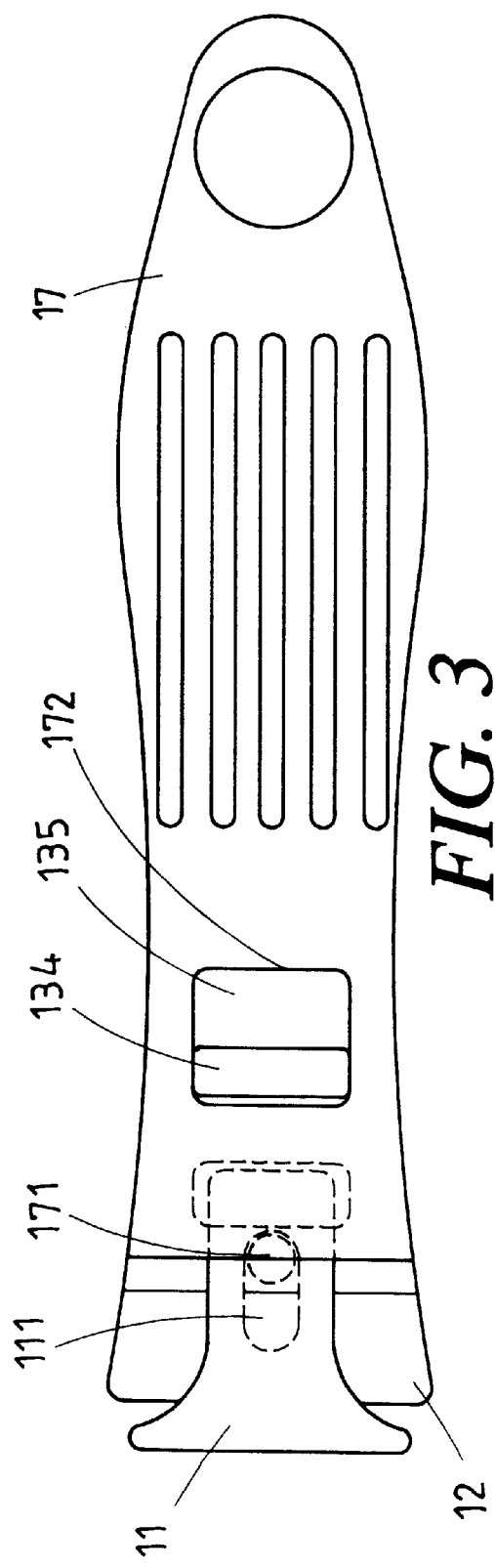
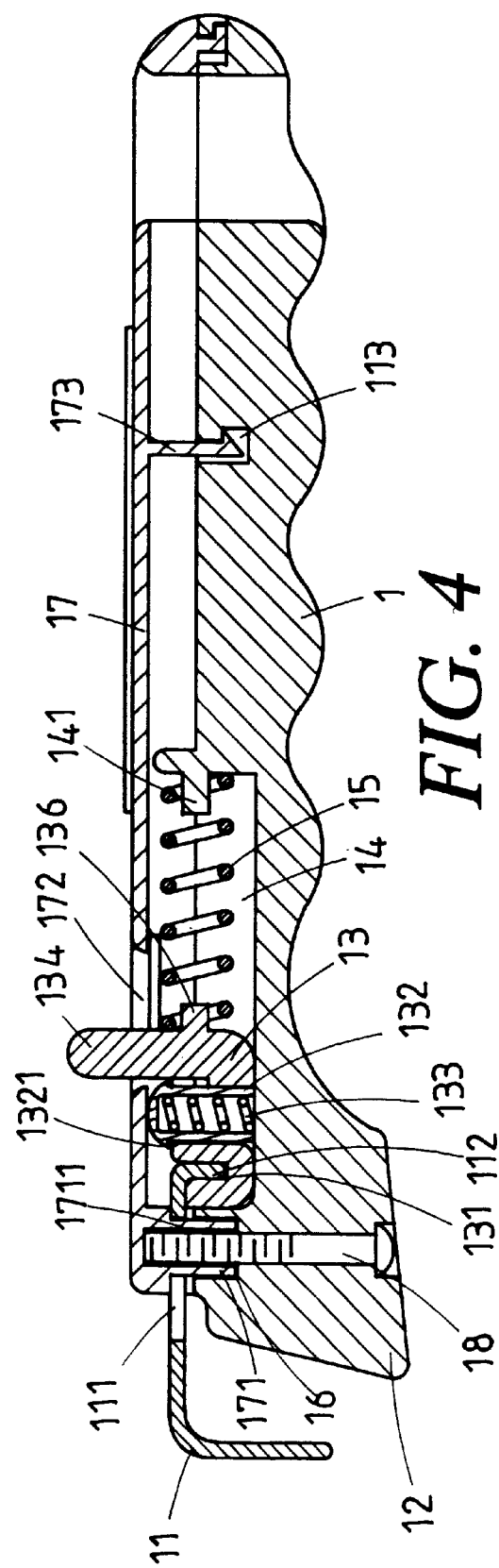
FIG. 3
FIG. 4

HANDLE FOR A FOOD CONTAINER

BACKGROUND OF THE INVENTION

1. Field of the Invention

The present invention relates to a handle for a food container (e.g., a pot or pan) for conveniently taking up or putting down a heated food container.

2. Description of the Related Art

In general, there are two types of food containers (e.g., pots or pans): one type with two short handles or a long handle attached thereto, and the other type is free of handle. A dishcloth is often used when picking up a heated pot or pan, yet the use is inconvenient and the dishcloth has sanitary problem. The handle(s) attached to the pot or pan still might be heated or even burnt during heating. A pincer device has been proposed to pick up the heated pot or pan, yet the clamping is not easy and the force for holding the pot or pan is found insufficient. As a result, potential injury exists. The present invention is intended to provide a handle for a pot or pan that mitigates and/or obviate the above problems.

SUMMARY OF THE INVENTION

It is a primary object of the present invention to provide a handle that is separate from the food container and may reliably hold the food container for picking up the food container.

In accordance with the present invention, a handle is provided for a food container with a lip and comprises:

- a handle main body including a recess defined in a side thereof, the handle main body further including a first clamping portion formed on a first end thereof and a second end for grasp;
- a handle cover mounted to the handle main body for covering the side having the recess, the handle cover including an opening;
- an actuator mounted in the recess of the handle main body and slidable along a longitudinal direction of the handle main body, the actuator including a first end and a second end with an extension extended beyond the opening of the handle cover for manual operation, the actuator further including a hole in a mediate portion thereof, a button including an enlarged head and being mounted in the hole of the actuator and biased toward the handle cover by a first elastic member, a second elastic member being provided for biasing the actuator toward the first clamping portion; and
- a clamping member including a second clamping portion formed on a first end thereof and located outside the handle main body and a second end securely engaged with the actuator to move therewith;
- wherein when the actuator is moved away from the first clamping portion and the button is thus moved to a position below the opening of the handle cover, the button is biased outward beyond the opening of the handle cover under the action of the first elastic member, and the enlarged head of the button is retained between the extension of the actuator and an edge defining the opening of the handle cover under action of the second elastic element, thereby securely clamping the lip of the food container between the first clamping portion and the second clamping portion.

The handle main body includes a stepped through-hole having a relatively larger portion and a relatively smaller portion. The clamping member includes a restraining slot in a mediate portion thereof. The handle cover includes a positioning block extended through the restraining slot and the relatively larger portion of the stepped through-hole of the handle main body. A screw is extended through the stepped through-hole for threadedly engaging with a screw hole in the positioning block.

The handle main body includes a plurality of engaging holes, and the handle cover includes a corresponding number of engaging pieces for engaging with the engaging holes.

The actuator includes an engaging groove, and the second end of the clamping member includes a hook member for engaging with the engaging groove.

Other objects, advantages, and novel features of the invention will become more apparent from the following detailed description when taken in conjunction with the accompanying drawings.

BRIEF DESCRIPTION OF THE DRAWINGS

FIG. 3 is a top view of the handle in accordance with the present invention.

FIG. 4 is a longitudinal sectional view of the handle in accordance with the present invention.

DETAILED DESCRIPTION OF THE PREFERRED EMBODIMENT

Figure 1:
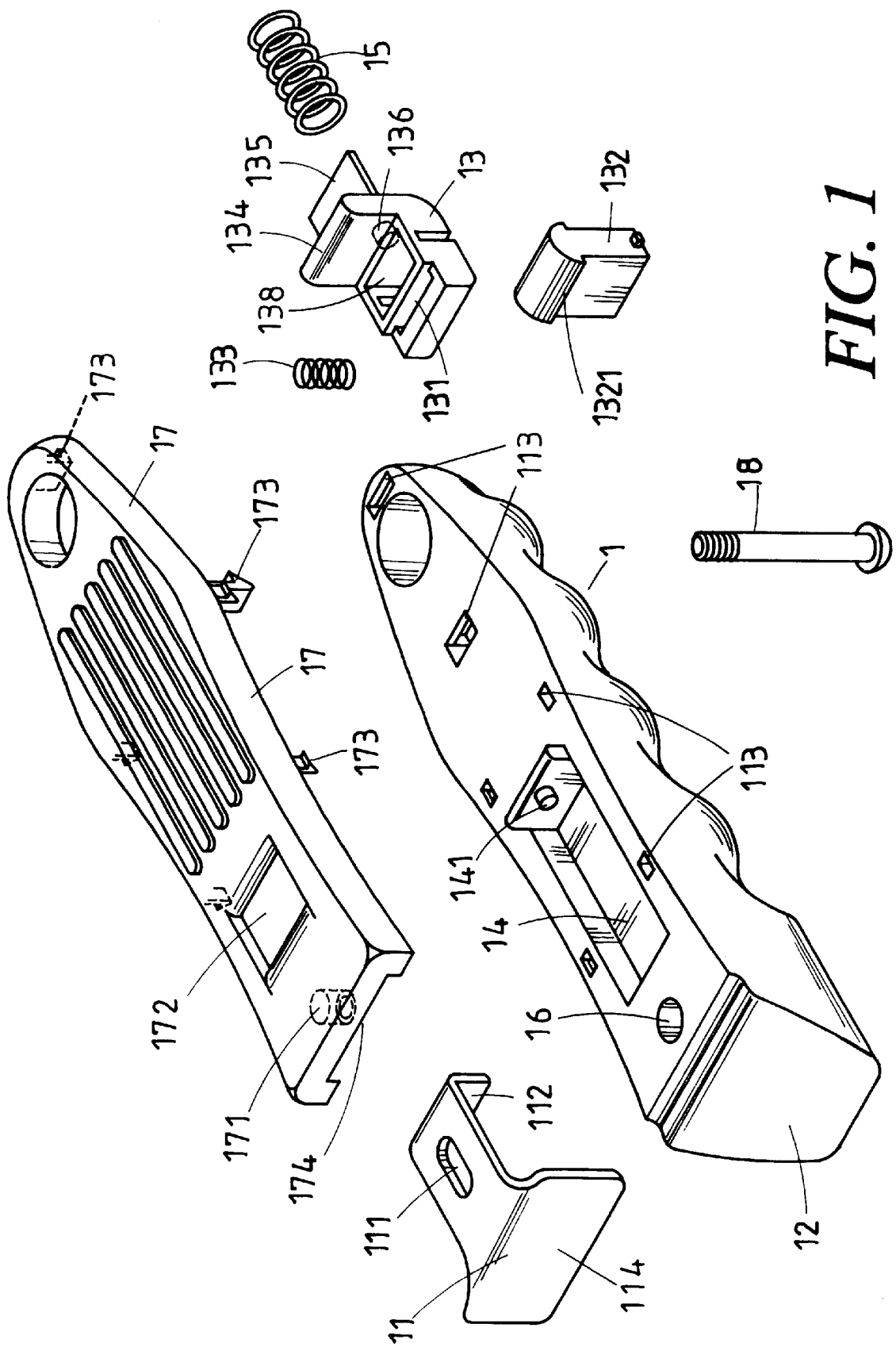
FIG. 1 is an exploded perspective view of a handle for a food container in accordance with the present invention.
Figure 2:
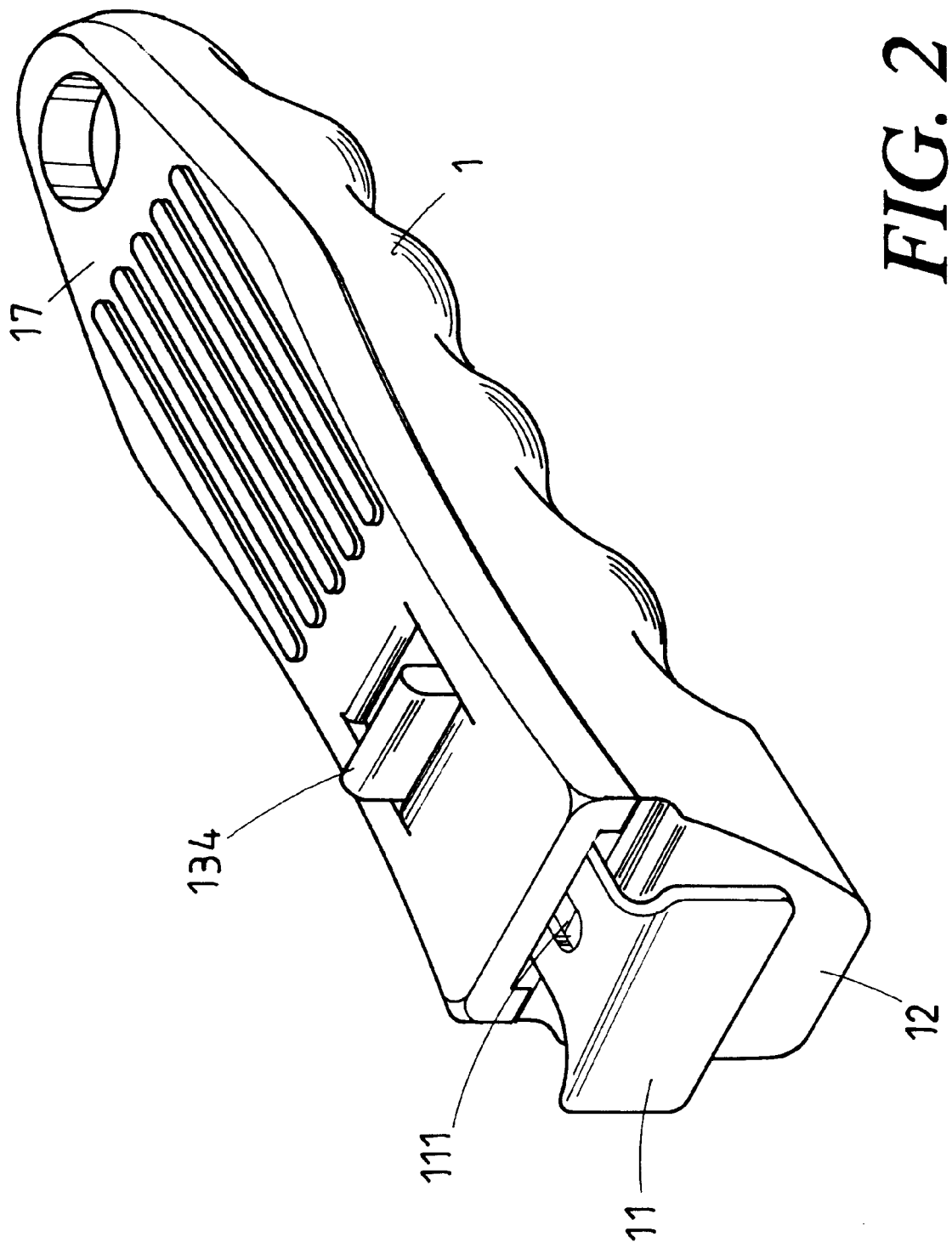
FIG. 2 is a perspective view of the handle in accordance with the present invention.

Referring to FIGS. 1 through 4, a handle in accordance with the present invention is provided to clamp a lip 21 of a food container 2 (FIG. 5) and generally includes a handle main body 1, a clamping member 11, an actuator 13, and a handle cover 17.

The handle main body 1 is an elongate member with a clamping portion 12 formed on a first end thereof and a recess 14 defined in an upper side thereof. In addition, a stepped through-hole 16 and a number of engaging holes 113 are defined in the handle main body 1. A protrusion 141 is formed on an end wall defining the recess 14.

The clamping member 11 includes a clamping portion 114 on a first end thereof and a second end 112 that is in the form of a downwardly extending hook member. A restraining slot 111 is defined in a mediate portion of the clamping member 11.

The actuator 13 includes an engaging groove 131 for securely engaging with the second end 112 of the clamping member 11 to move therewith. The actuator 13 further includes a second end with an upright extension 134 and a horizontal extension 135. A protrusion 136 is formed on the upright extension 134 and located below the horizontal extension 135. The actuator 13 further includes a vertical through-hole 138 in a mediate portion thereof. A button 132 is slidably extended through the vertical through-hole 138. The button 132 includes an enlarged upper end 1321 and a receptacle (not labeled, see FIG. 4) for receiving a spring 133 therein.

The handle cover 17 includes a number of engaging pieces 173 for engaging with the engaging holes 113 of the handle main body 1. The handle cover 17 further includes a positioning block 171 formed on an underside thereof, the block 171 having a downwardly facing screw hole 1711

(FIG. 4). The handle cover 17 further includes an opening 172 beyond which the upright extension 134 of the actuator 13 extends for manual operation.

In assembly, referring to FIGS. 1 and 4, the actuator 13 is mounted in the recess 14 of the handle main body 1. A spring 15 is attached between the protrusion 136 on the actuator 13 and the protrusion 141 on the handle main body 14, thereby biasing the actuator 13 toward the first end of the handle main body 14. Next, the second end 112 of the clamping member 11 is securely engaged in the engaging groove 131 of the actuator 13, wherein the restraining slot 111 of the clamping member 11 is partially aligned with the through-hole 16 of the handle main body 1. The handle cover 17 is then attached to the handle main body 1, wherein the engaging pieces 173 are engaged in the engaging holes 113. The positioning block 171 are extended through the restraining slot 111 of the clamping member 11 and a larger upper portion of the through-hole 16 of the handle main body 1. In addition, the button 13 is retained between the handle cover 17 and a bottom wall defining the recess 14 of the handle main body 1. As illustrated in FIG. 4, the upright extension 134 of the actuator 13 extends beyond the opening 172 of he handle cover 17 for manual operation. A screw 18 is extended through the stepped through-hole 16 of the handle main body 1 and threadedly engaged with the screw hole 1711 of the positioning block 171.

Figure 5:
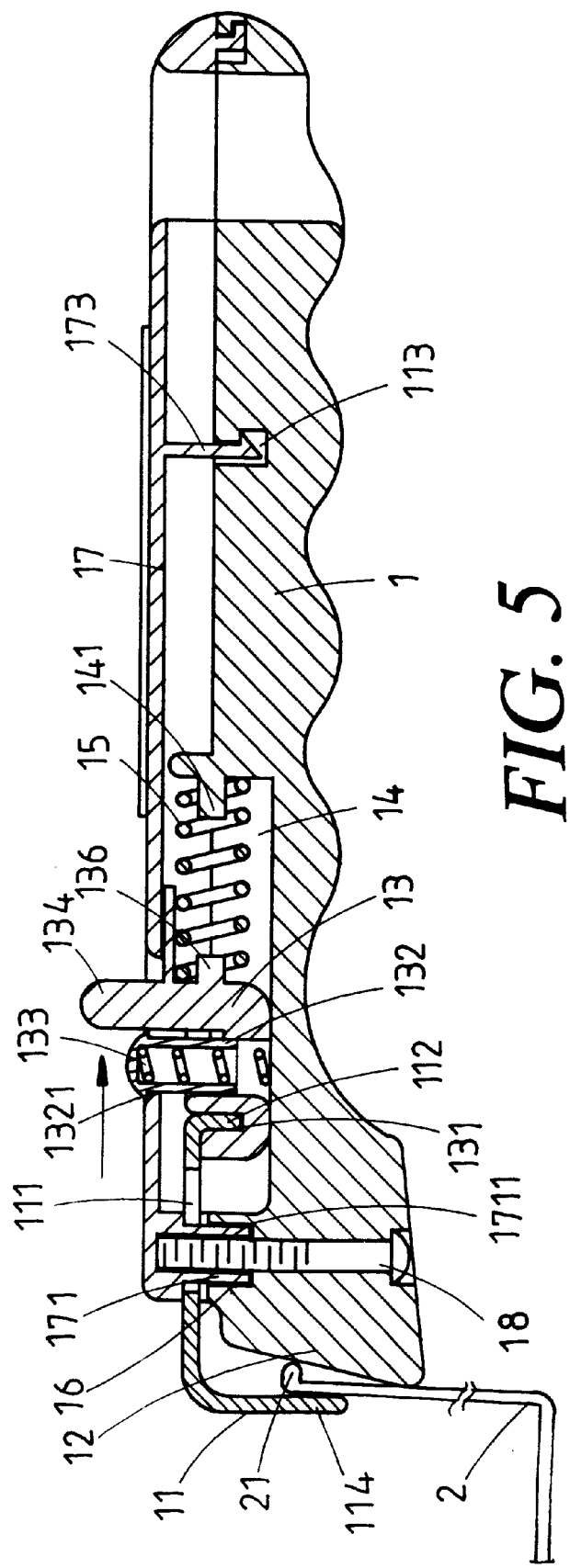
FIG. 5 is a sectional view similar to FIG. 4, wherein the handle is in a status for firmly clamping a lip of a food container.

In use, referring to FIG. 5, the user may place a lip portion 21 of a pot 2 between the clamping portion 114 of the clamping member 11 and the clamping portion 12 of the handle main body 1. Then, the user pulls the actuator 13 by the upright extension 134 away from the pot 2 (see the arrow in FIG. 5) such that the spring 15 is compressed and the button 132 springs upward when it reaches a position below the opening 172. The actuator 13 is moved away from the pot 2 until the lip 21 is clamped between the clamping portion 114 of the clamping member 11 and the clamping portion 12 of the handle main body 1, best shown in FIG. 5. It is appreciated that the restraining slot 111 of the clamping member 11 and a recessed portion 174 in an underside of the handle cover 17 allow the clamping member 11 to move along with the actuator 13. In addition, the expansion force of the spring 15 biases the actuator 13 toward the pan 2, thereby providing a force for reliably clamping the pan 2 by the lip 21. Further, the enlarged head 1321 of the button 132 is retained between the extension 134 of the actuator 13 and an edge defining the opening 172 of the handle cover 17 under action of the spring 15. The through-hole 138 of the actuator 13 may be replaced by a groove.

According to the above description, it is appreciated that a heated food container (a pot or pan) may be easily picked up and put down by using the handle in accordance with the present invention.

Although the invention has been explained in relation to its preferred embodiment, it is to be understood that many other possible modifications and variations can be made without departing from the spirit and scope of the invention as hereinafter claimed.

What is claimed is:

1. A handle for a food container with a lip comprising:

a handle main body including a recess defined in a side thereof, the handle main body further including a first clamping portion formed on a first end thereof and a second end for grasp;

a handle cover mounted to the handle main body for covering the side having the recess, the handle cover including an opening;

an actuator mounted in the recess of the handle main body and slidable along a longitudinal direction of the handle main body, the actuator including a first end and a second end with an extension extended beyond the opening of the handle cover for manual operation, the actuator further including a hole in a mediate portion thereof, a button including an enlarged head and being mounted in the hole of the actuator and biased toward the handle cover by a first elastic member, a second elastic member being provided for biasing the actuator toward the first clamping portion; and a clamping member including a second clamping portion formed on a first end thereof and located outside the handle main body and a second end securely engaged with the actuator to move therewith;

wherein when the actuator is moved away from the first clamping portion and the button is thus moved to a position below the opening of the handle cover, the button is biased outward beyond the opening of the handle cover under the action of the first elastic member, and the enlarged head of the button is retained between the extension of the actuator and an edge defining the opening of the handle cover under action of the second elastic element, thereby securely clamping the lip of the food container between the first clamping portion and the second clamping portion.

2. The handle as claimed in claim 1, wherein the handle main body includes a stepped through-hole having a relatively larger portion and a relatively smaller portion, the clamping member including a restraining slot in a mediate portion thereof, the handle cover including a positioning block extended through the restraining slot and the relatively larger portion of the stepped through-hole of the handle main body, the positioning block including a screw hole, and a screw being extended through the stepped through-hole for threadedly engaging with the screw hole of the positioning block.

3. The handle as claimed in claim 1, wherein the handle main body includes a plurality of engaging holes, and the handle cover includes a corresponding number of engaging pieces for engaging with the engaging holes.

4. The handle as claimed in claim 1, wherein the actuator includes an engaging groove, and the second end of the clamping member includes a hook member for engaging with the engaging groove.

* * * * *